A. HUGHES.
POTATO HARVESTER.
APPLICATION FILED APR. 24, 1915.
1,181,768.
Patented May 2, 1916.
2 SHEETS—SHEET 1.
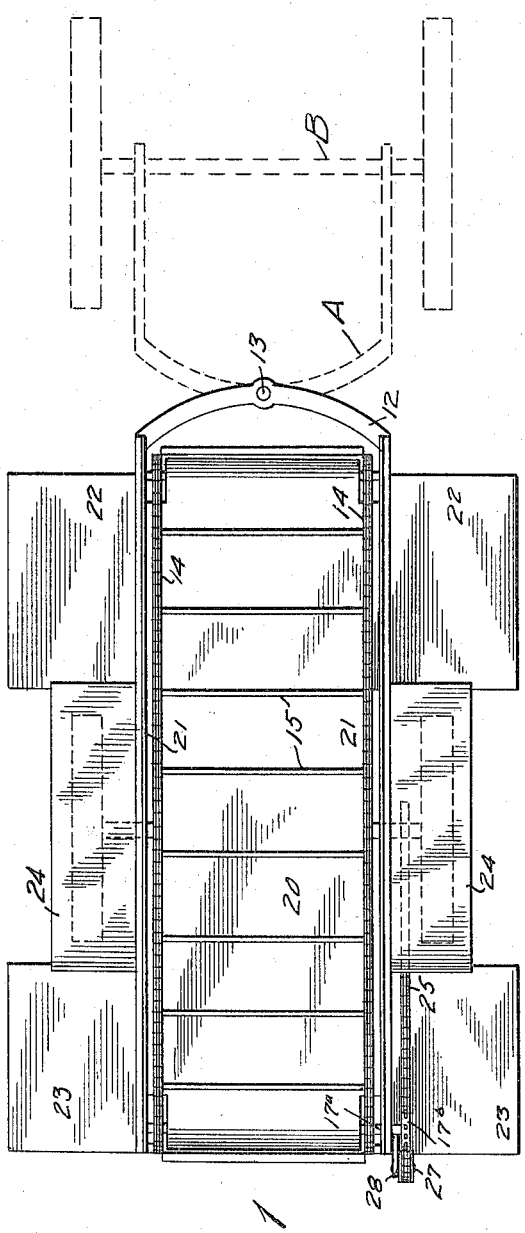
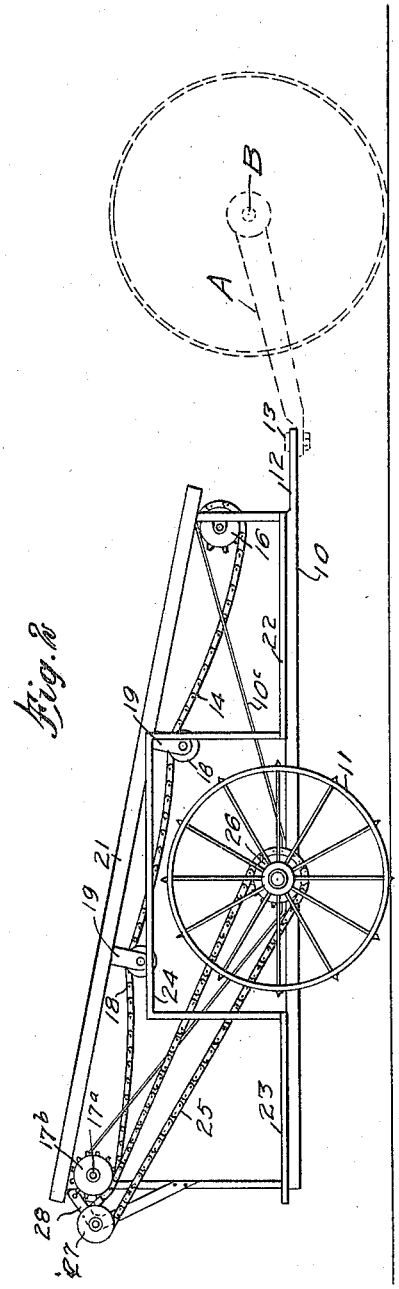
WITNESSES
INVENTOR
Alfred Hughes
BY
ATTORNEYS

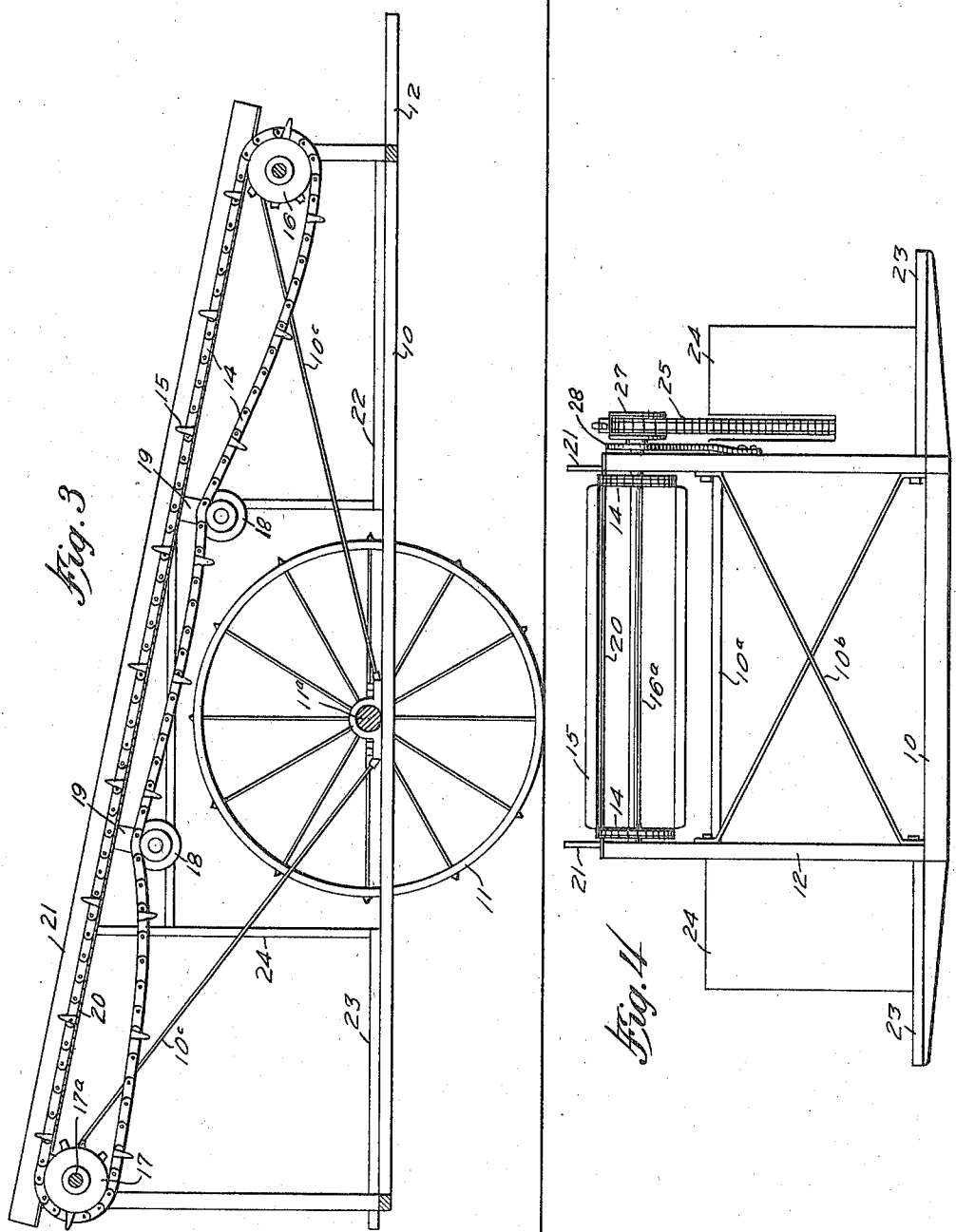

UNITED STATES PATENT OFFICE.

ALFRED HUGHES, OF MONDOVI, WASHINGTON.

POTATO-HARVESTER.

1,181,768.  Specification of Letters Patent.  Patented May 2, 1916.

Application filed April 24, 1915. Serial No. 23,627.

*To all whom it may concern:*

Be it known that I, ALFRED HUGHES, a citizen of the United States, and a resident of Mondovi, in the county of Lincoln and State of Washington, have invented a new and Improved Potato-Harvester, of which the following is a full, clear, and exact description.

My invention relates to a harvester adapted to be connected behind a potato digger and receive the potatoes from the latter.

The object of my invention is to provide an inclined table with platforms at each side, and a traveling conveyer so arranged as to cause the potatoes to be moved upwardly on the inclined table between the platforms, so that workmen on the latter may pick potatoes and conveniently and expeditiously fill crates and bags.

The invention will be particularly explained in the specific description following.

Reference is had to the accompanying drawings forming part of this specification, in which similar characters of reference indicate corresponding parts in all the views, and in which:

Figure 1 is a plan view of a potato harvester embodying my invention; Fig. 2 is a side elevation thereof; Fig. 3 is a longitudinal vertical section on an enlarged scale; and Fig. 4 is a rear end view.

I have indicated in dotted lines an axle B of a potato digger, which may be of any approved form, and hence is not illustrated, the connection being established by a bail A indicated also in dotted lines.

My improved harvester comprises a wheeled vehicle designated generally by the numeral 10, and running wheels 11. The frame 10 has a curved front bar 12 adapted for connection as at 13 with the bail A by a bolt, or the like. An endless chain conveyer 14 having transverse conveyer slats 15 runs over front sprockets 16 and rear sprockets 17. There are also provided for the lower run of the chain 14 idler sprockets 18 on hangers 19. The upper run of conveyer 14 travels over an elevated table 20 which inclines upwardly from the front to the rear of the vehicle. The table is provided with side flanges 21 to prevent escape of the potatoes at the sides of the table.

On the frame 10 I provide front platforms 22 at each side of the table 20 and rear platforms 23 at each side of the table. On these platforms workmen may stand so as to conveniently reach the potatoes being moved upwardly over the table 20, so that the workmen may conveniently pick the potatoes and fill them into crates, bags, or other receptacles. At the center of the vehicle I provide on the frame 10 a housing 24, the top of which is elevated above the platforms 22 and 23. Thus the boxes or crates may be placed on the top of the housing, or the workmen may sit thereon while working, should continued standing become irksome.

In order to actuate the chain conveyer 14 from the vehicle wheels 11, I provide a drive chain 25 which runs around a sprocket 26 turning with one of the wheels 11 and running also around a flanged pulley 27 supported on the frame 10 adjacent to the shaft $17^a$ on which the upper sprocket wheels 17 are mounted. The flanged pulley 27, in the present instance, is supported on a bracket 28. The drive chain 25 is thus driven directly by the turning of the running wheels 11, and in order to actuate the chain conveyer 14 and give the same the proper direction of movement, the drive chain 25 is arranged beneath the shaft $17^a$ and the upper run of the drive chain engages a sprocket $17^b$, fixed on the shaft $17^a$, at the underside of the sprocket. Thus the conveyer will be so actuated that the upper run thereof will travel upwardly over the table 20 to carry the potatoes from the front rearwardly, past the workmen on the platforms at opposite sides of the table.

Suitable braces are provided on the frame, there being shown at the rear end, Fig. 4, a cross bar $10^a$ and X-braces $10^b$. At the sides suitable braces $10^c$ extend from adjacent the axle $11^a$ of the running wheel toward the opposite ends.

Having thus described my invention, what I claim as new and desire to secure by Letters Patent, is:

1. In a harvester of the character described, a wheeled frame having an elevated table, a traveling conveyer having one run arranged to travel over the table, means for operating the conveyer, platforms at each side of the frame at the front and rear thereof, and housings for the wheels between and connecting the platforms, the tops of the housings being above the platforms and serving as supports for receptacles.

2. In a harvester of the character described, a wheeled vehicle having a table inclined from front to rear of the vehicle and having flanged sides, platforms near the front and rear ends of the vehicle and below the table, on which workmen may stand to pick material from the table, housings for the vehicle wheels between the front and rear platforms and above the same; the tops of the housing being elevated above the said platforms and serving as supports for receptacles; a chain conveyer provided with transverse slats and having a run traveling upwardly over said table, and means to actuate said conveyer.

In testimony whereof, I have signed my name to this specification in the presence of two subscribing witnesses.

ALFRED HUGHES.

Witnesses:
J. W. Fox,
R. R. Cathcart.

Copies of this patent may be obtained for five cents each, by addressing the "Commissioner of Patents, Washington, D. C."